Figure 1:
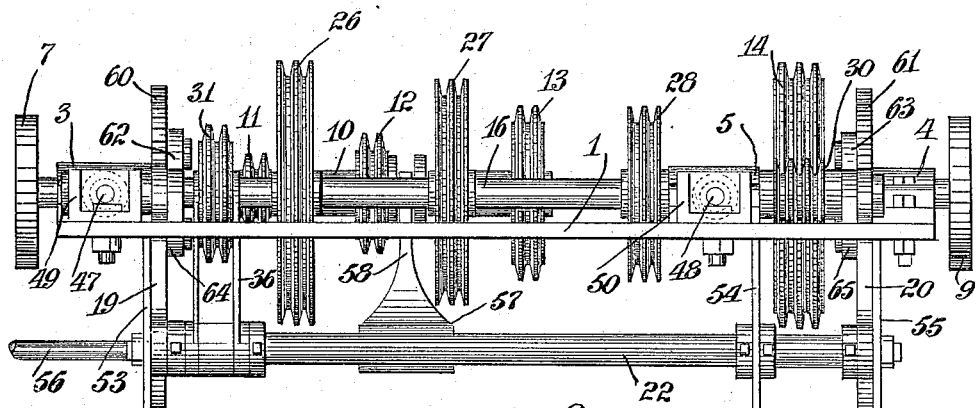

F. S. RUTTMANN.
VARIABLE SPEED TRANSMISSION MECHANISM.
APPLICATION FILED JUNE 2, 1914.

1,195,272.

Patented Aug. 22, 1916.
2 SHEETS—SHEET 1.

WITNESSES:
Ro¹¹.S. Kennedy
D. Artmann

INVENTOR:
Ferdinand S. Ruttmann
by Frank T. Wentworth
his Attorney.

F. S. RUTTMANN.
VARIABLE SPEED TRANSMISSION MECHANISM.
APPLICATION FILED JUNE 2, 1914.

1,195,272.

Patented Aug. 22, 1916.
2 SHEETS—SHEET 2.

WITNESSES:

INVENTOR:
Ferdinand S. Ruttmann
by Frank T. Wentworth
his Attorney.

UNITED STATES PATENT OFFICE.

FERDINAND S. RUTTMANN, OF NEW YORK, N. Y.

VARIABLE-SPEED-TRANSMISSION MECHANISM.

1,195,272.  Specification of Letters Patent.  Patented Aug. 22, 1916.

Application filed June 2, 1914. Serial No. 842,383.

*To all whom it may concern:*

Be it known that I, FERDINAND S. RUTTMANN, a citizen of the United States, residing at the borough of Manhattan, city, county, and State of New York, have invented certain new and useful Improvements in Variable-Speed-Transmission Mechanisms, of which the following is a specification, reference being had therein to the accompanying drawings, which form a part thereof.

My invention relates to variable speed transmission mechanisms and more particularly to a type thereof wherein a driven member is actuated from a driving member through the medium of a plurality of pairs of selectively operative coöperating members carried by said driving member and a countershaft, and of coöperating members carried by said countershaft and said driven member.

The type of mechanism to which my invention relates is now extensively used, particularly in connection with transmission gearing for automobiles and ordinarily consists of driving spur gears of different diameters mounted upon the engine clutch shaft and spur gears of different diameters mounted upon countershafts slidable axially thereof, so as to permit the selective operation of said shaft to mesh any gear upon said engine clutch shaft with the desired gear upon either countershaft. This well-known and extensively used variable speed gear transmission, while fairly satisfactory in use, possesses the disadvantages that a shifting of the gears into and out of mesh, cannot be accomplished with certainty, as under some conditions the teeth upon one gear will abut against those upon another. There is also a liability of the gears stripping which is particularly true when there is back lash in the gears.

Other disadvantages are the presence of noise under some conditions; the impossibility of automatic compensation because of wear in the coöperating gears and the weight of a gear box which makes it inadaptable for use in connection with light machines.

By my present invention, I aim to provide a variable speed transmission mechanism in which the power is transmitted from a driving shaft to a driven shaft through a countershaft, which shafts respectively have mounted thereon friction members, the engagement or disengagement of the friction member being accomplished by a movement of at least one of said members radially of the other. By reason of the employment of such friction members, I am enabled to provide a pressure exerting means for developing the requisite friction and insure the transmission of the desired power; which means will, also, have the additional function of maintaining the desired frictional engagement irrespective of wear upon the coöperating friction members. A transmission mechanism embodying my invention is capable of such a construction as to permit the development of a plurality of different speeds in the driven member or a reversal of the direction of rotation of said driven member. In conjunction with such a mechanism as I have above referred to I provide simple means by which at least one of the sets of friction members may be moved in opposition to the pressure exerting means, with the expenditure of but little energy at the point of control; which controlling means if desired may also be utilized to control the operative effect of said pressure exerting means in a manner to permit the development of only sufficient friction to start the load slowly thus permitting application of the gear transmission to a constant speed internal combustion engine and give an elasticity to the power derived therefrom similar to that secured by the cut-off mechanism of steam engines. I also provide a structure wherein the effective frictional power for transmitting power from the driving member to the driven member may be, if desired, increased by the duplication of the countershaft mechanism and the friction elements mounted thereon.

The invention consists in the novel features of construction and combination of parts hereinafter set forth and described and more particularly pointed out in the claims hereto appended.

Figure 2:
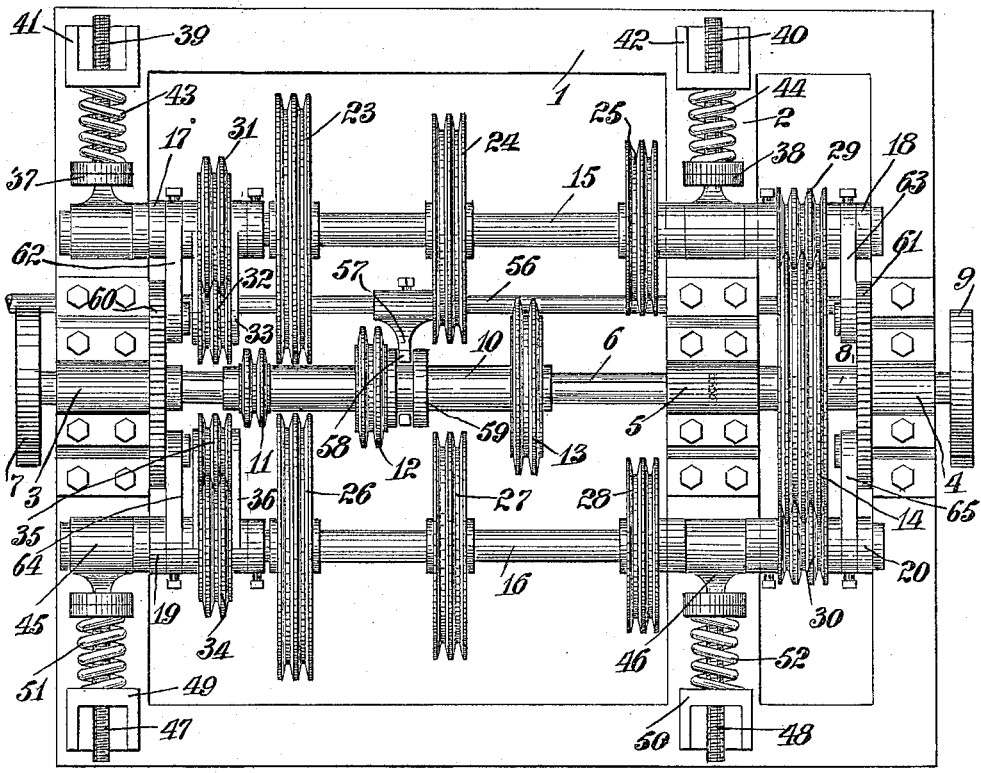
Figure 3:
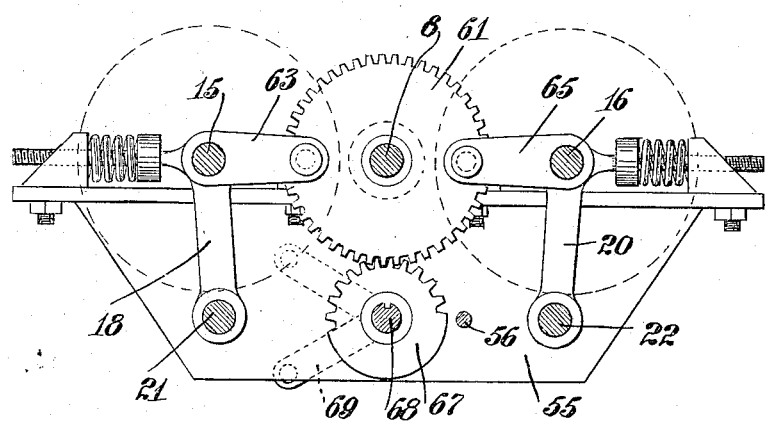
Figure 4:
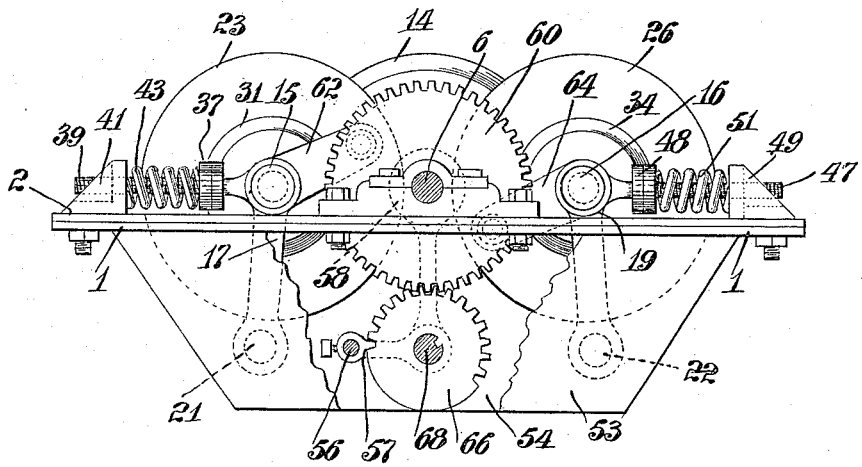

Figure 1 is a side elevation of a variable speed transmission mechanism embodying my invention; Fig. 2 is a plan view thereof; Fig. 3 is a detail view showing one set of the pressure developing springs and the means adjacent thereto, for overcoming the tension of said springs in disengaging the friction members from each other; and Fig. 4 is a similar view of the other set of springs and means adjacent thereto for assisting in the mechanism shown in Fig. 3, Like letters refer to like parts throughout the several views.

In the embodiment of my invention shown in the accompanying drawings, the entire mechanism is shown as supported by a frame 1, having a cross bar 2. The end bars of the frame 1 are provided with bearings 3 and 4; and the cross bar 2 is provided with a bearing 5, all of said bearings being in alinement. Mounted in the bearings 3 and 5 is a driving shaft 6 provided with a coupling flange 7; and mounted in the bearings 4 and 5 is a driven shaft 8 provided with a coupling flange 9. The bearing 5 is elongated to accommodate the adjacent ends of the shafts 6 and 8.

The driving shaft 6 is adapted to be connected in any desired manner with a source of power, which power is transmitted at a differential speed to the driven shaft 8 through friction members carried upon the said shafts respectively and coöperating friction members mounted upon one or more countershafts, means being provided whereby the relation of said friction members may be varied to bring different sets of coöperating members into the operative relation and thus vary the speed or the direction, of rotation of the driven shaft, or prevent the transmission of power from the driving shaft to the driven shaft for the purpose of permitting such changing of the relation of the coöperating friction members or of cutting off the power from said driven shaft.

While the construction and arrangement of the friction members is susceptible to various modifications without departing from the spirit and scope of my invention as defined by the claims hereto appended, I have shown in the accompanying drawings an embodiment of the invention which I prefer to employ, as securing simplicity in structure and reliability in operation.

In the form of the invention shown, I spline upon the driving shaft 6 an elongated hub 10 carrying a plurality of friction disks 11, 12, 13, the peripheries of which are provided with friction surfaces, preferably channeled as shown to increase the effective areas thereof. By making the channels V-shaped, as shown, and providing a plurality of such channels in the periphery of each disk, the proper engagement of the disk with its coöperating disk will be insured irrespective of any slight variance in the quantity of movement of the hub 10, or a premature engagement of any of said disks with its coöperating member.

The disk 12 is of considerably greater diameter than the disk 11 and the disk 13 is of considerably greater diameter than the disk 12.

By constructing the hub 10 and its friction members in the manner described, said members are caused to rotate with the driving shaft 6 while being slidable upon said shaft to permit any one of said friction members to be brought into engagement with its coöperating friction member to vary the speed or direction of rotation of the driven shaft 8.

The driven shaft 8 carries a friction member or disk 14, the periphery of which is provided with a friction surface preferably channeled as and for the purposes heretofore described in connection with the friction members 11, 12 and 13. The power is transmitted to the shaft 8 through said friction member 14.

Power is transmitted from one of the friction members carried by the shaft 6 to the friction member carried by the shaft 8 through a countershaft having mounted thereon friction members adapted respectively to frictionally engage a coöperating friction member or disk 11, 12 or 13 and to engage the friction member or disk 14. I also provide means whereby the coöperating friction members or disks upon the driving shaft and upon the countershaft may be separated so as to afford a clear field for the movement of one set of said friction members or disks relatively to the other set and selectively engage any disk upon the driving shaft with its coöperating member or disk upon the countershaft. I also preferably employ means having a normal tendency to force the coöperating members into the desired frictional engagement thus making the movement necessary to engage these disks automatic and also causing a constant, substantially uniform pressure acting upon said members or disks which will automatically take up any wear and insure at all times substantially maximum frictional engagement between these members.

To insure the transmission of the full power applied to the shaft 6, to the shaft 8, I preferably provide two countershafts and to simplify the operation of the device, I provide means whereby both of said shafts may be simultaneously moved away from the shafts 6 and 8 against spring tension so that upon the release of the actuating mechanism therefor said countershafts will be simultaneously moved toward said shafts 6 and 8 and will cause two similar members or disks to simultaneously act upon the friction member or disk carried by the driving shaft and upon the member or disk coöperating with the member 14, to engage that member.

In the form of the invention shown, I employ two countershafts 15 and 16 mounted respectively in oscillatory arms 17 and 18 and 19 and 20, the arms 17 and 18 being mounted upon a rod 21 and the arms 19 and 20 being mounted upon a rod 22. Said arms are loosely mounted upon their respective rods, the power for imparting movement to said countershafts being applied directly thereto and not through the rods upon which said arms are mounted. This construction, however, is immaterial to the invention as any other desired supporting means for said shafts and any desired structure for applying power thereto may be used.

The countershafts 15 and 16 each have mounted thereon a set of friction members or disks consisting of a plurality of similarly constructed and oppositely disposed friction members or disks each of which is adapted to coöperate with a particular friction member or disk of the set upon the driving shaft. Upon the shaft 15 are friction members or disks 23, 24 and 25, which are of graduated diameters, the order of graduation being inverse of that of the disks 11, 12 and 13 upon the shaft 6. The friction members or disks 26, 27 and 28 upon the shaft 16 are identical in dimensions and location as those upon the shaft 15. The periphery of each of the friction members or disks 23 to 28 inclusive is provided with a friction surface provided with V-shaped channels so as to dove tail with its coöperating member or disk, and in conjunction therewith, secure a large operative friction surface.

The members 23—26 are adapted to coöperate with the member 11; the members 24—27, with the member 12; and the members 25—28, with the member 13.

The countershafts 15 and 16 each carry a friction member 29—30 adapted to coöperate with the member 14, said members 29—30 each having a V-shaped channeled periphery of friction material. The countershaft 15 also carries a friction member or disk 31 in constant engagement with an idler friction member 32 mounted in an angular bracket 33, one arm of which is loosely mounted on the rod 21 and the other arm of which carries the bearings for said idler 32. This bracket is loosely mounted upon the shafts 15 so as to receive movement therefrom and preserve the desired position of the idler with relation to its member 31 and the member 11 on the driving shaft 6. The other countershaft 16 has associated therewith a similar reversing mechanism comprising the friction member or disk 34 mounted thereon; the idler 35 carried by one arm of the oscillatory bracket 36, the other arm of said bracket being loosely mounted on the rod 22. Said bracket 36 is loosely mounted on the shaft 16 so as to receive movement therefrom in the same manner as the bracket 33 is actuated by the shaft 15.

The foregoing construction is for the purpose of securing a reversal of the direction of rotation of the countershafts 15 and 16 and of the driven shaft 8. The members 31—32, 33—34 are each provided with peripheral friction faces having V-shaped channels thereon, the idler members 33—34 being adapted to coöperate with the member 11.

The shaft 15 is provided adjacent the opposite ends thereof with spring cup fittings 37 and 38 provided with guide stems 39 and 40 passing through the spring seat brackets 41 and 42 carried by the frame 1. Encircling each of said guide stems 39 and 40 and bearing upon said spring fittings 37 and 38 and said spring cup brackets 41 and 42 respectively are the coiled springs 43 and 44. These springs are always under tension so as to have a normal tendency to move the shaft 15 toward the driving shaft 6 with sufficient force to secure the desired frictional engagement of any friction member or disk upon said shaft 15 with its coöperating friction member or disk upon said shaft 6 and also the desired frictional engagement of the friction members 29 and 30 and the friction member 14 upon the driven shaft 8. By pivotally mounting the spring cup members 37 and 38 upon the shaft 15 excessive side strains upon the springs 43 and 44 are avoided. The shaft 16 is provided with spring cup fittings 45 and 46, guide stems 47 and 48, spring cup brackets 49 and 50, and springs 51 and 52, the operative effect of which parts upon the shaft 15 being the same as the corresponding mechanism described in connection with the shaft 15.

Pendant from the frame 1 are the plates 53, 54 and 55 supporting the rods 21 and 22 which are so mounted in said plate as to be held against rotary movement. Slidably mounted in bearings in said plates, is a shifting rod 56 actuating a forked arm 57, the forked end 58 of which coöperates with a grooved disk 59 carried by the hub 10; the said hub and the various friction members carried thereon being adapted to be shifted axially of the driving shaft 6 by means of this mechanism. To permit this shifting of the said hub and their friction members or disks, it is not only necessary to provide means for disengaging the coöperating friction members upon the said hub and upon shafts 15 and 16, but also to move said shafts to an extent to provide a proper clearance for this movement of the friction members upon the said driving shaft. The mechanism which I prefer to use for this purpose comprises crank members as a gear 60 loosely mounted upon the driving shaft 6 and a gear 61 loosely mounted upon the driven shaft 8, the crank pins of which members are connected with the shaft 15 by the pitmen 62 and 63 and with the countershaft 16 by the pitmen 64 and 65. By setting the crank pins upon the gears 60 and 61 at diametrically opposite points, oscillatory movement of said gears will impart simultaneous movement to the countershafts 15 and 16 away from the shafts 6 and 8 and permit simultaneous movement of said shafts toward each other under their respective springs. The gears 60 and 61 are actuated by means of the segmental gears 66 and 67 keyed to a rotatable shaft 68 which shaft may be actuated by any desired controlling means through the medium of a crank arm 69 carried by said shaft.

The arm 57 is preferably slidably mounted upon the shaft 68.

By using crank members as the gears 60 and 61 and pitmen connecting same with the countershafts 15 and 16, I get a toggle lever effect and by the use of the small gears 66 and 67 acting upon large gears 60 and 61 and a crank shaft for actuating same, I secure a compound lever system which permits the development of sufficient power at the countershafts to readily overcome the tension of the springs 43, 44, 51 and 52, with the expenditure of a small amount of energy at the controller. It is not my intention, however, to limit the means for shifting the said countershafts to the specific construction shown, it being apparent that other mechanisms may be readily substituted for that shown without departing from the spirit and scope of the invention.

The operation of the herein described variable speed transmission mechanism is substantially as follows: When the parts are in the position shown in Figs. 1 and 2 of the drawings, the driving shaft 6 has no operative effect upon the driven shaft 8. If it be desired to transmit power from the driving shaft to the driven shaft, the shaft 68 is first given a partial rotation thus turning the crank members 60 and 61 to force the shafts 15 and 16 against the tension of their respective springs, away from the shafts 6 and 8 and thus disengage the friction members or disks 29 and 30 from the friction member or disk 14 upon the driven shaft 8 and at the same time allow sufficient clearance for the movement of the various friction members mounted by means of the hub 10 upon the driving shaft 6. While the shafts 15 and 16 are thus held in their outward position, the pitmen will all be in the position of the pitmen 63 and 65 shown in Fig. 3 of the drawings. When the members are in this position the rod 56 is moved axially to the desired extent and to the right of Figs. 1 and 2 until one of the friction members or disks 11, 12 or 13 is in position to be engaged by its coöperating friction disk upon the shafts 15 and 16. Assuming that it is desirable to start at the lowest speed, when the disk 11 is brought within the same plane as the disks 23 and 26, the shaft 68 is released permitting the springs 43, 44, 51 and 52 to force the countershafts 15 and 16 toward the shafts 6 and 8 engaging the members 23 and 26 with the member 11. If these friction members are not in the exact position required, the V-shaped channeled peripheral friction surfaces thereof engaging one with the other will impart the necessary additional movement of the hub 10 to insure the proper operative position of these friction members. By providing a plurality of channels or tongues upon each of the friction members, considerable leeway is afforded as it is not necessary that any particular groove should coöperate with any particular tongue.

In the form of the invention shown the construction is such as to admit of a low speed, a high speed and an intermediate speed as well as a reverse.

If it be desired to run at the intermediate speed, the movement imparted to the rod 56 will be double the quantity of that required for the low speed, thus bringing the friction member 12 into the operative relation to the friction members 22 and 27 and bringing the friction member 11 past the operative position of the coöperating friction members 23 and 26.

If the high speed is desired the movement will be three times that required for the low speed, the normal position of the friction members carried by the driving shaft and those carried by the countershafts being such that when one of the members upon the driving shafts is in engagement with its coöperating member upon the counter shafts, the other two members upon the driving shaft will be out of the operative relation to their coöperating members upon said countershafts.

If it be desired to reverse the direction of the rotation of the driven member 8, the rod 56 will be moved to the left of Figs. 1 and 2 bringing the low speed friction member into operative relation to the idler members 32 and 33 thus transmitting power therethrough to the friction members 31 and 34 and changing the direction of rotation of the countershafts 15 and 16, and through them, that of the driven shaft 8.

It will be observed that the friction members or disks 29 and 30 irrespective of the speed for which the mechanism is set, will always operatively engage the friction member or disk 14 upon the driven member 8 and that the springs 43 and 44 and 51 and 52 not only impart movement to the countershafts 15 and 16 to bring any friction member or disk thereon into the operative relation to its coöperating disk upon the shaft 6, but that irrespective of wear upon the various friction members said springs will always bring them into the operative relation and develop sufficient pressure to insure the frictional engagement necessary to transmit the maximum power from the driving shaft to the driven shaft. In other words, notwithstanding wear upon the coöperating friction members, the means normally tending to force the countershaft toward the driving shaft will in the absence of any limitation upon the movement of said countershafts excepting the frictional members or disks upon the driving shaft 6, will prevent any slippage in the transmission mechanism.

By a construction such as that herein shown and described, the proper engagement of the coöperating friction members is insured and this engagement can be secured without any possible interference between the members upon the driving shaft and those upon the countershafts since the radial displacement of the countershaft leaves sufficient clearance to avoid any possibility of such interference. Furthermore, by controlling the action of the springs 43, 44, 51 and 52 when restoring the countershafts to normal, slippage between the friction members upon the driving shafts and upon the countershafts may be permitted until the engine has gradually taken up the full load, thus permitting a gradual increase in the speed of the driven member until the maximum power is applied thereto.

A variable speed transmission mechanism such as is herein described is especially adapted for use upon light vehicles such as cycle-cars, but it is not my intention to limit the invention to use in any particular connection.

Having described the invention what I claim as new and desire to have protected by Letters Patent is:

1. A variable speed transmission mechanism embodying therein a power shaft comprising a driving section and a driven section, a counter shaft, a plurality of friction members of different diameters upon one section of said power shaft, a plurality of friction members of different diameters upon said counter shaft, said members respectively being adapted to coöperate with one of said first named friction members, selectively operating means whereby any of the coöperating friction members upon said power shaft and said countershaft may be brought into the operative relation with each other, springs acting upon said countershaft whereby a predetermined constant co-efficient of friction is created when said friction members are in the operative relation and wear upon said members is compensated for, means whereby said friction members may be separated against the tension of said springs and coöperating members carried by said countershaft and the section of said power shaft other than that carrying said friction members whereby power is transmitted from the driving section of said shaft to the driven section thereof through said countershaft.

2. A variable speed transmission mechanism embodying therein a power shaft embodying therein a driving section and a driven section, a countershaft, a plurality of friction members of different diameters upon one section of said power shaft, a plurality of friction members of different diameters upon said countershaft, said members respectively being adapted to coöperate with one of said first named friction members, selectively operating means whereby any of the coöperating friction members upon said power shaft and said countershaft may be brought into operative relation with each other, coöperating members carried by said counter shaft and by the other section of said power shaft whereby power is transmitted from the former to the latter, means normally tending to force said coöperating members into engagement with each other, and means whereby said members may be separated in opposition to said last named means.

3. A variable speed transmission mechanism embodying therein a power shaft embodying therein a driving section and a driven section, a countershaft, a plurality of friction members of different diameters upon one section of said power shaft, a plurality of friction members of different diameters upon said countershaft, said members respectively being adapted to coöperate with one of said first named friction members, selectively operative means whereby any of the coöperating friction members upon said power shaft and said countershaft may be brought into operative relation with each other, coöperating members carried by said countershaft and by the other section of said power shaft whereby power is transmitted from the former to the latter; means normally tending to force said coöperating members into engagement with each other, and a compound leverage system whereby said members may be separated in opposition to said last named means.

4. A variable speed transmission mechanism embodying therein a power shaft embodying therein a driving section and a driven section, a countershaft, a plurality of friction members of different diameters upon one section of said power shaft, a plurality of friction members of different diameters upon said countershaft, said members respectively being adapted to coöperate with one of said first named friction members, selectively operative means whereby any of the coöperating friction members upon said power shaft and said countershaft may be brought into operative relation with each other; coöperating members carried by said countershaft and by the other section of said power shaft whereby power is transmitted from the former to the latter, means normally tending to force said coöperating members into engagement with each other, toggle levers acting upon said countershaft, and a lever system actuating said toggle levers whereby said members may be separated in opposition to said last named means.

5. A variable speed transmission mechanism embodying therein a power shaft embodying therein a driving section and a driven section, an oscillatory countershaft, a plurality of friction members of different diameters upon one section of said power shaft, a plurality of friction members of different diameters upon said countershaft, said members respectively being adapted to coöperate with one of said first named friction members, selectively operative means whereby any of the coöperating friction members upon said power shaft and said countershaft may be brought into operative relation with each other, means whereby said countershaft may be oscillated comprising an oscillatory crank, a pitman transmitting movement from said crank to said countershaft, means actuating said crank and springs acting in opposition to said last named means, and coöperating members carried by said countershaft and by the other section of said power shaft whereby power is transmitted from the former to the latter.

6. A variable speed transmission mechanism embodying therein a power shaft embodying therein a driving section and a driven section, an oscillatory countershaft, a plurality of friction members of different diameters upon one section of said power shaft, a plurality of friction members of different diameters upon said countershaft, said members respectively being adapted to coöperate with one of said first named friction members, selectively operative means whereby any of the coöperating friction members upon said power shaft and said countershaft may be brought into operative relation with each other, means whereby said countershaft may be oscillated comprising a gear, a crank pin thereon, a pitman transmitting movement from said crank pin to said countershaft, means adapted to oscillate said gear and springs acting on said countershaft counter to said last named means, and coöperating members carried by said countershaft and by the other section of said power shaft whereby power is transmitted from the former to the latter.

7. A variable speed transmission mechanism embodying therein a power shaft embodying therein a driving section and a driven section, an oscillatory countershaft, a plurality of friction members of different diameters upon one section of said power shaft, a plurality of friction members of different diameters upon said countershaft, said members respectively being adapted to coöperate with one of said first named friction members, selectively operative means whereby any of the coöperating friction members upon said power shaft and said countershaft may be brought into operative relation with each other, means whereby said countershaft may be oscillated comprising a gear, a crank pin thereon, a pitman transmitting movement from said crank pin to said countershaft, means adapted to oscillate said gear, a plurality of fixed spring seat brackets, a plurality of spring cup fittings loosely mounted on said countershaft, a guide stem carried by each of said fittings and slidably mounted in said brackets respectively, and a spring acting between each of said brackets and said fittings respectively, and coöperating members carried by said countershaft and by the other section of said power shaft whereby power is transmitted from the former to the latter.

8. A variable speed transmission mechanism embodying therein a power shaft embodying therein a driving section and a driven section, a countershaft, a plurality of friction members of different diameters upon one section of said power shaft, a plurality of friction members of different diameters upon said countershaft, said members respectively being adapted to coöperate with one of said first named friction members, a reversing mechanism comprising a friction member carried by said countershaft, and an idler friction member adapted to coöperate therewith and with one of said first named friction members, selectively operative means whereby any of the coöperating friction members upon said power shaft and said countershaft may be brought into operative relation with each other, means whereby said friction members may be moved toward or from each other, and coöperating members carried by said countershaft and by the other section of said power shaft whereby power is transmitted from the former to the latter.

9. A variable speed transmission mechanism embodying therein a power shaft embodying therein a driving section and a driven section, an oscillatory countershaft, a plurality of friction members of different diameters upon one section of said power shaft, a plurality of friction members of different diameters upon said countershaft, said members respectively being adapted to coöperate with one of said first named friction members, a reversing mechanism comprising a friction member carried by said countershaft, and an idler friction member adapted to coöperate therewith and with one of said first named friction members, selectively operative means whereby any of the coöperating friction members upon said power shaft and said countershaft may be brought into operative relation with each other, means whereby said countershaft may be oscillated, and coöperating members carried by said countershaft and by the other section of said power shaft whereby power is transmitted from the former to the latter.

10. A variable speed transmission mechanism embodying therein a power shaft embodying therein a driving section and a driven section, a countershaft, a plurality of friction members of different diameters upon one section of said power shaft, a plurality of friction members of different diameters upon said countershaft, said members respectively being adapted to coöperate with one of said first named friction members, said friction members respectively being provided with channeled peripheral friction faces, selectively operative means whereby any of the coöperating friction members upon said power shaft and said countershaft may be brought into operative relation with each other, means whereby said friction members may be moved toward or from each other, and coöperating members carried by said countershaft and by the other section of said power shaft whereby power is transmitted from the former to the latter.

11. A variable speed transmission mechanism embodying therein a power shaft embodying therein a driving section and a driven section, a plurality of oscillatory countershafts arranged at different points radially of said power shaft, a plurality of friction members of different diameters upon one section of said power shaft, a plurality of similar friction members of different diameters upon each of said countershafts, similar members upon said countershafts being adapted respectively to coöperate with one of said first named friction members, selectively operative means whereby any of the coöperating friction members upon said power shaft and said countershafts may be brought into operative relation with each other, means whereby said friction members on said countershafts and their coöperating members on said power shaft may be simultaneously moved away from and toward each other to disengage or engage said coöperating friction members comprising an oscillatory crank member, a plurality of pitmen transmitting movement from said crank member to said countershafts respectively whereby said countershafts will be simultaneously moved in opposite directions, means actuating said crank member and springs acting on said countershafts respectively in opposition to said last named means and coöperating members carried by said countershafts respectively and by the other section of said power shaft whereby power is transmitted from the former to the latter.

In witness whereof I hereunto affix my signature in the presence of two subscribing witnesses this 28th day of May, 1914.

FERDINAND S. RUTTMANN.

Witnesses:
F. T. WENTWORTH,
CLARICE FRANCK.

Copies of this patent may be obtained for five cents each, by addressing the "Commissioner of Patents, Washington, D. C."